April 9, 1957     J. F. MOSER, JR     2,788,312
CONTROL OF BOGGING IN FLUIDIZED COKING SYSTEM
Filed May 11, 1954
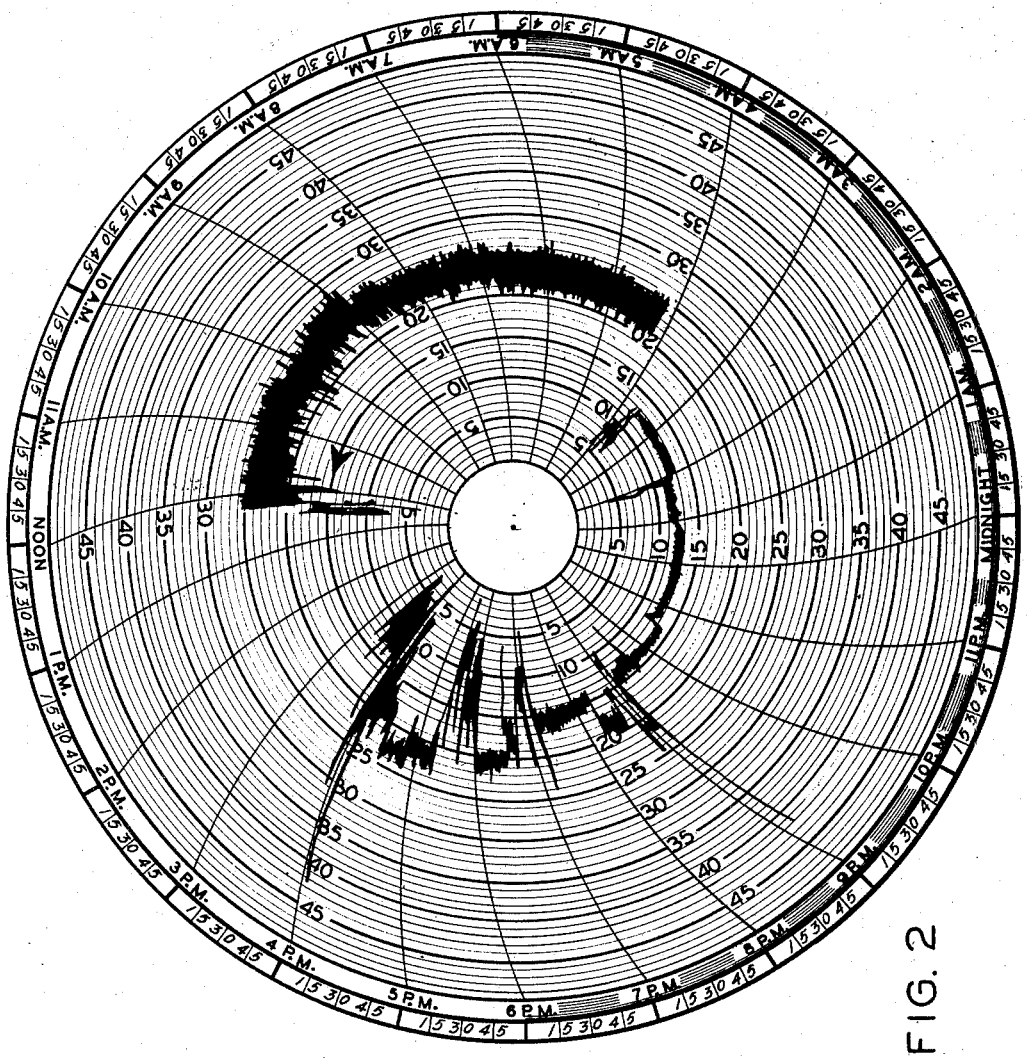
FIG. 2
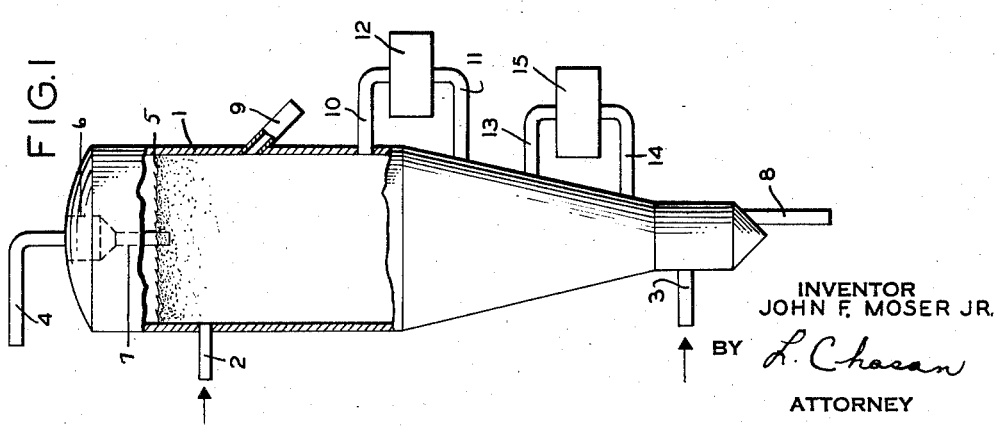
FIG. I
INVENTOR
JOHN F. MOSER JR.
BY *L. Chasan*
ATTORNEY

United States Patent Office 2,788,312
Patented Apr. 9, 1957

2,788,312

CONTROL OF BOGGING IN FLUIDIZED COKING SYSTEM

John F. Moser, Jr., Baton Rouge, La., assignor to Esso Research and Engineering Company, a corporation of Delaware Application May 11, 1954, Serial No. 428,983

3 Claims. (Cl. 196—55)

The present invention relates to a method of operating a fluid bed coking system for heavy hydrocarbon oils and the like. The invention relates particularly to a process for controlling the operation of a fluid bed by controlling the feed rate of the oil to be coked in accordance with certain operating characteristics of the fluid bed described hereinafter.

There has recently been developed an improved process known as the fluid coking process. The fluid coking unit consists basically of a reaction vessel or coker and a burner vessel. In a typical operation the heavy oil to be processed is injected into the reaction vessel containing a dense, turbulent fluidized bed of hot inert solid particles, preferably coke particles. Uniform temperatures exists in the coking bed. Uniform mixing in the bed results in virtually isothermal conditions and effects instantaneous distribution of the feed stock. In the reaction zone the feed stock is partially vaporized and partially cracked. Product vapors are removed from the coking vessel and sent to a fractionator for the recovery of gas and light distillates therefrom. Any heavy bottoms is usually returned to the coking vessel. The coke produced in the process remains in the bed coated on the solid particles.

Heavy hydrocarbon oil feeds suitable for the coking process are heavy or reduced crudes, vacuum bottoms, pitch, asphalt, other heavy hydrocarbon residua or mixtures thereof. Typically such feeds can have an initial boiling point of about 700° F., an A. P. I. gravity of about 0° to 20° and a Conradson carbon residue of about 5 to 40 wt. percent. (As to Conradson carbon residue see ASTM test D-189-52.)

It is preferred to operate with solids having an average particle size ranging between 100 and 1000 microns in diameter with a preferred particle size range between 150 and 400 microns. Preferably not more than 5% has a particle size below about 75 microns since small particles tend to agglomerate or are swept out of the system with the gases. Coke, sand, glass heads, metal shot and catalytically inert particles can be utilized.

Several characteristics of heavy oils make it difficult to apply the fluidized solids technique. For example, although relatively volatile oils such as gas oil may be efficiently converted by contacting with preheated fluidized catalytic particles, the conversion of a heavy, viscous oil containing tacky, near-solid components, is quite another matter. The heavy oil or the tacky components tend to cause the solid particles of a fluid solids system to adhere to each other and to form agglomerates. In many cases, therefore, a fluid bed of solids rapidly bogs down and becomes inoperative.

It is known that a fluidized bed of solids for coking or conversion of heavy oils, such as heavy petroleum residues, can compensate for this and be maintained in operation by keeping the feed rate low. In this way all of the feed is promptly evaporated or cracked and the viscous residue quickly dried up so that no substantial agglomeration can take place. The capacity of a given system becomes very low however when operating under conditions that are obviously safe. Unfortunately, the maximum allowable feed rate cannot be predicted with accuracy or safety since it depends upon many factors such as quality of feed, temperature of solids, rate of solids circulation, etc. Hence, in order to be safe it has been considered necessary in the prior art to keep the feed rate well below the rate at which a fluid bed tends to agglomerate and bog down. Obviously, this severely limits the capacity of a coking system. It requires the construction of a relatively large and expensive unit for a relatively small throughput.

To complicate the problem further, it is known that the most desirable types of conversion product, particularly when heavy petroleum oils are to be converted to gasoline and other low boiling products, are obtained by operating the coking system at a relatively low temperature. The preferred range is preferably below about 1000° F. It may be as low as 925° F. or lower in some cases. For commonly available feeds, an operating temperature of about 950° F. in the coking zone is commonly preferred at present. Unfortunately, operation at any temperature below 1000 F. adds to the danger of bogging the bed down even at moderately lower feed rates.

It is therefore highly advantageous to be able to operate the coking system at or near its full capacity at all times without running the risk of bogging down the bed. This would avoid the expensive operation of completely shutting down the apparatus and cleaning it out, before starting up anew.

This invention provides a means to so operate the fluid coking system. It is based on the fact that at incipient bogging the pressure differential between 2 points at different elevations in the fluid bed decreases sharply. Thus bogging can be predicted and avoided by diminishing the feed rate or raising the temperature of the coking operation. Both have the effect of restricting the liquid concentration on the coke.

This invention provides a system for controlling the fluid coking operation in the manner indicated. According to this invention the feed rate is decreased, or the temperature raised when the pressure differential between 2 points at different elevations in the dense turbulent fluidized bed decreases below a predetermined level. Pressure differential determinations can be made at different locations along the vertical sections of the fluid bed.

The pressure readings are conveniently taken in inches of water and taps are provided at the 2 different levels. The pressure differences are recorded on conventional pressure differential recording devices as manufactured by Brown, Foxboro, etc. It has been found that when the pressure differential decreases from 30–50%, of the normal level predeterminted by experience (see Fig. 2), incipient bogging conditions prevail. Unless the process variables are changed in the manner indicated before, complete bogging will result.

The distance between the taps is not critical but about 3 feet, i. e., 2–4 feet are preferred for bed levels of 5–75 feet.

This invention will be better understood by reference to the drawings.

Figure 1 is a flow diagram. In the drawing the numeral 1 is a coking vessel constructed of suitable materials for operation at 950° F. It contains a confined stripping section 21, i. e., one of restricted diameter, which terminates in an inverted conical section 22. A bed of coke particles preheated to a sufficient temperature, e. g., 1125° F. to establish the required bed temperature of 950° F. is made up of suitable particles of 150–400 microns. The bed of solid particles reaches an upper level indicated by the numeral 5. The bed is fluidized by means of a gas such as steam entering the vessel at the stripping portion via pipe 3. The fluidizing gas passes upwardly through the vessel at a velocity of 1 ft./sec. establishing the solids at the indicated level. The fluidizing gas serves also to strip the vapors and gases from the hot coke which flows down through the vessel and enters through pipe 9.

A reduced crude oil, e. g., a Hawkins crude to be converted is preferably preheated to a temperature not above its cracking temperature, e. g. 700° F. It is introduced at a feed rate of 0.7 wt./wt. solids/hr. into the bed of hot coke particles via line 2, preferably at a plurality of points in the system. The oil upon contacting the hot particles undergoes decomposition and the vapors resulting therefrom assist in the fluidization of the solids in the bed and add to its general mobility and turbulent state. The product vapors pass upwardly through the bed and are removed from the coking vessel via line 4 after passing through cyclone 6 from which solids are returned to the bed via dipleg 7.

Two sets of pressure differential taps with pressure differential meters are provided as shown. The taps are lines 10, 11, 13 and 14 and the meters 12 and 15. One or more sets can be used. The 2 taps of each set are approximately 3 feet apart in elevation. More than one set of taps can be utilized to increase the safety factor against bogging and against the possibility of 1 set becoming blocked or meter failure. Pressure differential readings are taken and a difference of 25 inches in water is obtained at 12 and 24 inches at 15. Experience shows this is in the normal range for good operation, i. e., is the reference predetermined level. No change need be made in feed rate or temperature. Subsequent readings give a value of 15 and 14 or a decrease of 40%. The temperature can be raised to about 965° F. to prevent bogging. The feed rate alternatively can be lowered to 0.5–0.6 wt./wt. solids/hr. for the same purpose. When the readings return to the predetermined level the operating conditions can be readjusted. Both temperature and feed rate can be utilized simultaneously to obtain the desired control.

The meters can transmit signals to a recorder or the recorder can be directly substituted for the meters. Manual or automatic control equipment can be utilized.

Figure 2 is a chart of typical pressure differential readings which were obtained in the accumulation of data for this invention and shows a normal "predetermined level."

Manual or automatic recordings of pressure differential data can be made. The varying of feed rate and temperature can also be automatic or manual.

In order to express this invention more fully the following conditions of operation of the coker are set forth below:

*Conditions in fluid coker*

|  | Broad Range | Preferred Range |
| --- | --- | --- |
| Temperature °F | 850–1,200 | 900–1,000 |
| Pressure, Atmospheres | 1–10 | 1.5–2 |
| Superficial Velocity of Fluidizing Gas, ft./sec. | 0.2–3 | 0.5–1 |
| Feed Rate, wt./wt. Solids in Fluid Bed/Hr. | 0.06–30 | 0.2–0.9 |

It is to be understood that this invention is not limited to the specific examples which have been offered merely as illustrations and that modification may be made without departing from the spirit of the invention.

What is claimed is:

1. A process for coking a heavy hydrocarbon oil which comprises the steps of contacting a heavy oil coking charge stock at a coking temperature in the range of 850° to 1200° F. with a body of catalytically inert coke particles maintained in the form of a dense turbulent fluidized bed in a reaction zone wherein the oil is converted to product vapors, the feed rate of the coking charge being in the range of 0.06–30 w./w. solids/hr.; determining the pressure differential between 2 points at different elevations in the fluidized bed and restricting the liquid concentration on the coke when the pressure differential decreases from 30–50% from a predetermined normal level, whereby bed bogging is prevented.

2. The process of claim 1 in which the liquid concentration is restricted by raising the coking temperature within the specified range.

3. The process of claim 1 in which the liquid concentration is diminished by restricting the feed rate within the specified range.

References Cited in the file of this patent

UNITED STATES PATENTS 2,271,148    Becker et al.    Jan. 27, 1942